United States Patent [19]

Nicholson

[11] Patent Number: 5,195,759
[45] Date of Patent: Mar. 23, 1993

[54] STATIC SEAL

[75] Inventor: Terence P. Nicholson, Hexham, Great Britain

[73] Assignee: Specialist Sealing Ltd., Jersey, Channel Islands

[21] Appl. No.: 740,848

[22] Filed: Aug. 6, 1991

[30] Foreign Application Priority Data

Aug. 6, 1990 [GB] United Kingdom ............... 9017173

[51] Int. Cl.⁵ ............................................. F16J 15/06
[52] U.S. Cl. .................................... 277/215; 277/229; 277/235 R
[58] Field of Search ............... 277/139, 196, 198, 204, 277/215, 229, 235 R, 236

[56] References Cited

U.S. PATENT DOCUMENTS

| 1,651,277 | 11/1927 | Hubbard | 277/215 |
| 1,653,439 | 12/1927 | Payne | 277/215 |
| 2,882,083 | 4/1959 | Palumbo et al. | 277/204 X |
| 3,117,795 | 1/1964 | Price | 277/204 |
| 3,235,276 | 2/1966 | Leonard | 277/215 X |
| 3,323,807 | 6/1967 | Vanderbilt, Jr. | 277/235 R X |
| 3,371,938 | 3/1968 | Hamm et al. | 277/215 X |
| 3,854,736 | 12/1974 | Farham | 277/204 |
| 4,893,656 | 1/1990 | Willhoff | 277/198 X |
| 5,082,296 | 1/1992 | Aizawa et al. | 277/235 R X |

FOREIGN PATENT DOCUMENTS

| 875892 | 5/1953 | Fed. Rep. of Germany | 277/215 |
| 1527344 | 3/1977 | United Kingdom . | |
| 2097872 | 11/1982 | United Kingdom . | |
| 2210939 | 6/1989 | United Kingdom . | |

Primary Examiner—William A. Cuchlinski, Jr.
Assistant Examiner—Scott W. Cummings
Attorney, Agent, or Firm—Ailes, Ohlandt & Greeley

[57] ABSTRACT

A static seal capable of accommodating significant lack of flatness comprises a PTFE envelope 1, within which is a filling 5 consisting of wound or nested turns of thin metal strip 7 perforated to provide resilience in the direction of their width. Individual turns can move or collapse to different extents, thereby accommodating lack of flatness of surfaces to be sealed. Turns of fluid-impervious material may be distributed among the turns of perforated strip.

12 Claims, 5 Drawing Sheets

STATIC SEAL

BACKGROUND OF THE INVENTION

This invention relates to static seals, of the kind comprising a jacket of soft gasket material, and a filling or packing material within the envelope.

The invention is applicable particularly but not exclusively to seals intended for sealing surfaces which are not perfectly flat or not perfectly parallel, for example flange and body connections of glass-lined or enamel pressure vessels. In such vessels, the surface coating of glass, enamel or other protective material inevitably introduces a lack of flatness, both axially and circumferentially. Distortion of the flange surfaces occurs when the glass powder that has been sprayed onto the vessel surfaces is fused, the fusing temperature being in the region of 750° C. A seal for sealing such surfaces must be capable of accommodating the lack of flatness.

DISCUSSION OF PRIOR ART

Conventional seals for glass-lined or enameled vessels commonly have an envelope of PTFE or other resistant material, and a filling. The envelope provides the actual seal and also resists attack from the contents of the vessels or pipelines sealed by the seal. The filling commonly comprises asbestos in various forms, together with a corrugated ring of metal, usually stainless steel. Instead of asbestos, a plastics filling may be injected on site.

All of these known seals have serious disadvantages. The use of asbestos is to be avoided in any case. It is a time-consuming and difficult operation, to create a satisfactory seal using asbestos-based packing materials. Injected plastics filling is less troublesome, but nevertheless involves a considerable amount of work on site.

An object of the invention is to provide a static seal capable of accomodating surface imperfections and in particular lack of flatness in the surfaces to be sealed, and which reduces or eliminates work on site.

SUMMARY OF THE INVENTION

According to the invention, a static seal comprises an envelope, and a filling within the envelope, comprising a plurality of adjacent turns of strip material, arranged with the width direction of the strip extending generally perpendicular to the sealing faces of the seal, the strip material being resilient and having apertures extending through it, distributed along the strip length, whereby the strip is resilient in the direction of its width.

To provide the necessary resilience or flexibility of the strip in its width direction, the apertures or perforations in the strip should be closely spaced and have sizes of the same order of magnitude as the width of the strip.

The webs or partitions of strip material between the apertures preferably have transverse dimensions comparable with the thickness of the strip.

Preferably, the arrangement of the apertures is such that, at no point along the length of the strip, is the strip material continuous across the width of the strip.

The adjacent turns of strip material must be so arranged that they can move relative to one another, in the direction of the width of the strip. The strip may be wound as a spiral, or may comprise a plurality of nested rings.

The present seal or packing, comprising plural turns of strip material, in which each turn can move relative to the adjacent turn in the direction of the width of the strip, and each turn is resilient in the direction of the width of the strip, can adjust resiliently, and in a very localized manner, to variations in the surface flatness and parallelism of faces to be sealed.

Because of the apertures in the strip, the strip when compressed in the direction of its width does not act as a rigid strut but becomes in effect a maze or array of individual springs.

BRIEF DESCRIPTION OF THE DRAWINGS

The invention will be further described with reference to the accompanying drawings, in which.

DESCRIPTION OF PREFERRED EMBODIMENTS

Figure 1:
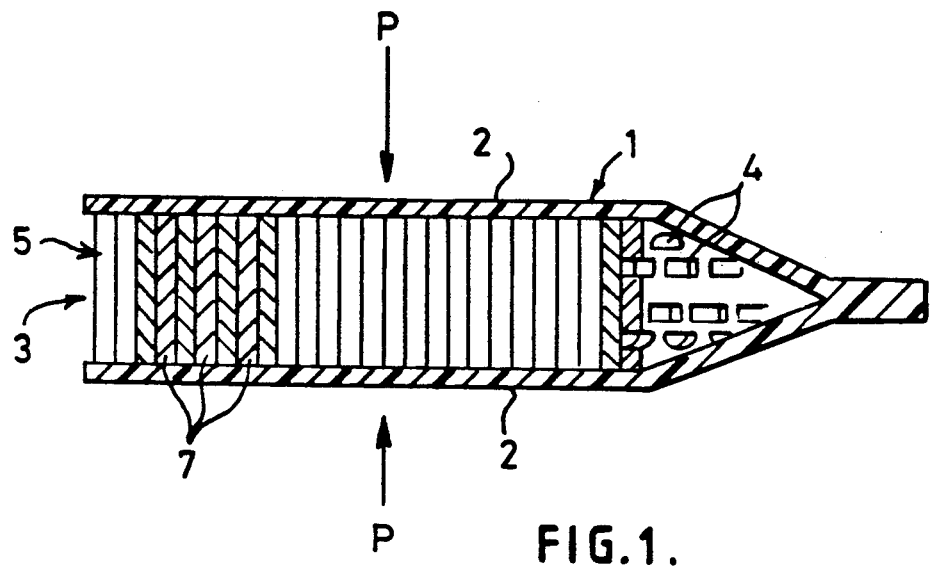
FIG. 1 is a radial cross section through a first seal embodying the invention.

The seal ring or packing shown in FIG. 1 has an annular envelope 1 of PTFE or other suitable inert impervious material, with external sealing faces 2 for contacting the members or surfaces to be sealed.

The envelope itself is essentially conventional. It may be formed by slitting a ring of PTFE, as in the case shown in FIG. 1, or by machining a block of PTFE, to form an annular internal space 3.

Conventionally, such envelopes are filled with asbestos-based or injected packing material.

In the illustrated seal of the invention, the envelope is filled with what can be regarded as an all-metal interior-sprung mattress 5.

This filing 5 comprises a multiplicity of turns of thin metal strip 7, set with the width of the strip parallel to and indeed substantially coaxial with the central axis of the seal, and thus perpendicular to sealing faces 2 and parallel to the direction of application of sealing force P.

Each turn of the metal strip rests radially on the adjacent turn, so that the strips together form a pack in which each strip supports its neighbour or neighbours. However, each turn is capable of moving in the axial direction, independently of its neighbour or neighbours. Accordingly, adjacent turns must not be pressed so tightly against one another that friction will prevent their relative movement in the axial direction.

The turns may comprise separate rings of strip material, nested one within another. However, it will usually be more convenient and more satisfactory to form the entire pack or mattress of turns by winding a continuous length of strip about a mandrel to form a spiral pack of strip having the desired internal diameters, the inner and outer ends of the strip being welded or otherwise secured to the adjacent turns to prevent the pack from unwinding.

As already mentioned, adjacent turns or coils must be capable of moving relative to one another in the axial direction. Accordingly, the spiral coil must not be wound over-tight. Furthermore, the strip itself must be free of imperfections which might prevent such movement and therefore must be deburred. It may optionally be plated or coated with a low-friction material and/or a lubricant may be provided between the turns.

A low-friction coating or surface treatment and/or intervening lubricant will also reduce the risk of galling between adjacent turns as a result of their relative movement in operation.

By way of example only, it is possible to provide a very thin layer of PTFE or expanded graphite, interleaved between the metal strips during the operation of coiling the strip.

The strip is perforated, or otherwise apertured, throughout its length, in such a way that, over at least a high proportion of the length, the material of the strip is not continuous across the width of the strip. The perforations 4 are of the same order of magnitude of size, as the width of the strip.

As a result, the pack formed by the turns of strip material can flex locally, and can in effect be regarded as a mass of minute springs capable of yielding locally to and compensating for local variations in the flatness of the surfaces to be sealed, between which the seal is compressed in use. It will be understood that each local "spring" has a radial dimension equal to the thickness of the strip. In the circumferential direction the effective size of each local spring element depends on the sizes and shapes of the perforations in the strip, which therefore need to be relatively small, while being at the same time sufficiently large to prevent compression and expansion of the strip in the direction parallel to the axis of the seal. These two requirements effectively mean that the apertures need to have dimensions not materially greater than the width of the strip, and not very greatly smaller than the width of the strip.

Preferably, the strips are perforated in such a manner that the strip material is not continuous across the width of the strip, at any point along the length of the strip.

It is particularly preferred, that the perforations be slots extending in the longitudinal direction of the strip, with intervening webs of a width comparable to the thickness of the strip. Preferably, there is a multiplicity of lines of such slots, each staggered relative to its neighbour or neighbours, and it is preferred that the width of metal remaining between adjacent lines is substantially equal to the thickness of the strip.

It has been found that slots having a ratio of width to length of 1:5 provide excellent results.

Because the strip is perforated through its thickness, there may be a faint possibility of leakage radially through the perforations, if the envelope 1 of the seal is damaged.

Figure 1A:
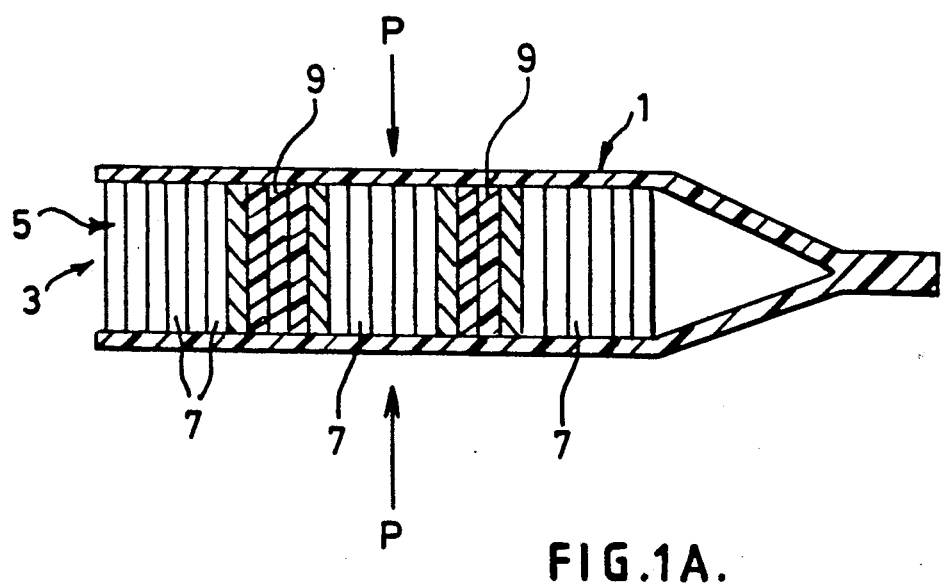
FIG. 1A is a radial cross section through a second seal embodying the invention.

This risk is believed to be small, because the perforations in adjacent terms would effectively form a labyrinth and/or throttling structure of high flow resistance even if they are not completely impervious to fluid flow. However, in order completely to eliminate this risk, one or more fluid-impervious barriers may be incorporated within the radial dimension of the seal, in order to prevent fluid flow parallel to the sealing faces of the seal. FIG. 1A illustrates a seal modified in this manner. This is similar to the seal illustrated by FIG. 1, but two turns of polytetrafluoroethylene strip 9 have been introduced between the turns of metal strip 7, at a position roughly one third of the radical distance outwards from the inner periphery of the filling 5, and a further two or three turns of polytetrafluoroethylene have been introduced at a position roughly two thirds from the inner to the outer periphery of the filling 5.

Figure 2:
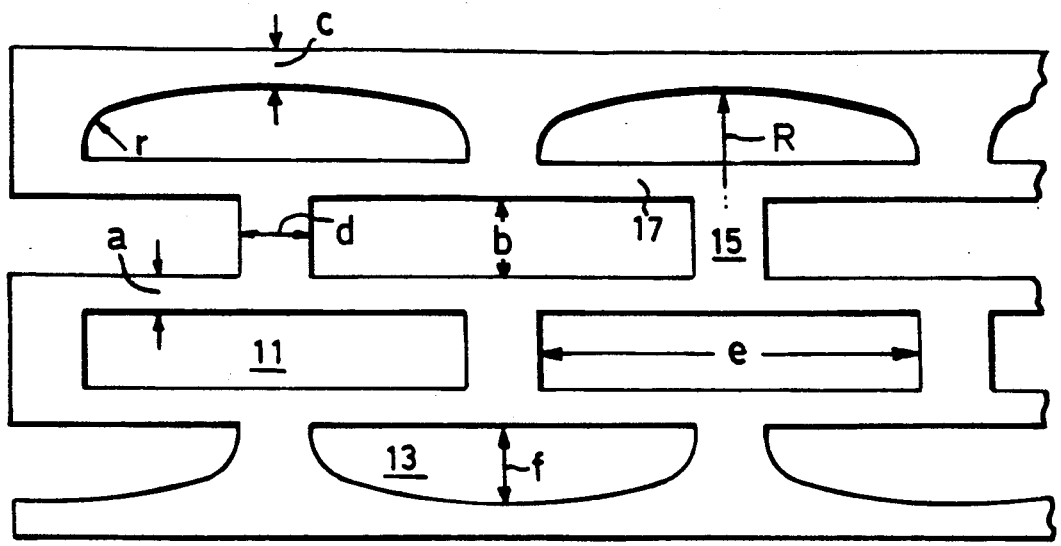
FIG. 2 shows one form of strip to be used in a seal embodying the invention.
Figure 3:
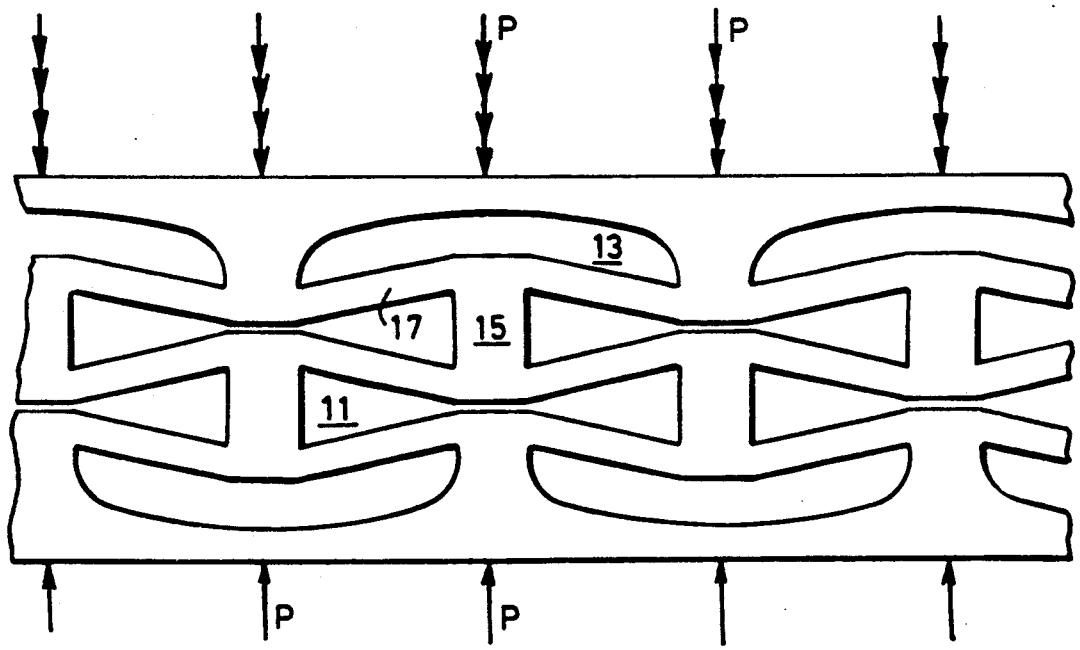
FIG. 3 shows the strip of FIG. 2, under compression.

FIG. 2 shows a particularly preferred form of strip, to be made of stainless steel with a thickness of 0.036 inches (0.91 mm) and a width of 0.50 inches (12.7 mm). FIG. 2 shows by way of example only typical dimensions of the slot-like perforations, in inches.

It will be seen that the perforations comprise four lines of slots each comprising slots all of the same length and pitch, with the slots in adjacent lines staggered by one half pitch.

The two central lines of slots 11 consist of rectangular slots, while the slots 13 of the outer lines have rectilinear sides adjacent the inner slots, and arcuate contours adjacent the edges of the strip.

The transverse webs 15 remaining between the ends of adjacent slots in each line have a width of 0.072 inches (1.83 mm), twice the thickness of the strip. The webs 17 left between adjacent lines, and between the outermost slots 13 and the edges of the strip, have widths of 0.036 inches (0.91 mm), equal to the thickness of the strip.

It has been found that, to obtain the best spring qualities and therefore the best compensation for local lack of flatness in the sealing surfaces, it is best to have the longitudinal webs 17 of even cross section, that is to say of square cross section having a width equal to the thickness of the strip.

When an annular filling composed of such strips is compressed between surfaces to be sealed, the transverse webs 15 act as struts while the longitudinal webs 17 can flex, enabling the entire seal to be resiliently compressed.

Because of the slots 11, 13, the strip can be compressed to different degrees locally on a small scale, of the same order of size as the longitudinal dimension of the slots. As already mentioned, adjacent turns of the strip can move relative to one another in the axial direction.

Consequently the seal, while being resilient as a whole, can undergo local deformation without loss of resilience or of sealing pressure. It is therefore able to accomodate local irregularities and lack of flatness in the surfaces to be sealed.

As already mentioned, the best spring properties are obtained if the longitudinal webs 17 are of substantially uniform cross section. In the illustrated case they are of square cross section. As a result, when the strip is compressed, these webs are stretched, within the natural elasticity of the strip material.

The transverse webs 15 are made thicker, to give enhanced strength and to act as force-transmitting struts of adequate strength and rigidity. Clearly, it would be undesirable for these struts 15 to bend or buckle, as this would interfere with the transmission and distribution of the applied forces and with the resilient behaviour of the strip.

The preferred strip material is stainless steel, this can provide the packing or mattress with a very good recovery factor when released from compression, even from between irregular surfaces. The good recovery factor of stainless steel strip makes it possible to re-use a seal, for example in an emergency if a new replacement is not available.

Alternatively, and in particular in circumstances where there is an extreme lack of flatness in the faces to be sealed, it may be advantageous to make the strip of another material, in particular another metal for example aluminium, copper, soft iron, monel and so on, as these metals have greater ductility than stainless steel and therefore will require a smaller clamping load to obtain a satisfactory seal.

As already mentioned, a thin layer of PTFE, expanded graphite or other material may be interleaved between the adjacent turns of strip, for example during coiling of the packing. However, if such a layer is provided, it must be sufficiently thin to avoid any possibility of the material of which it is composed filling the apertures in the strips. Plainly, if the apertures became filled, the compressibility of the strip would be reduced and its ability to respond locally to small imperfections would be impaired.

Figure 4:
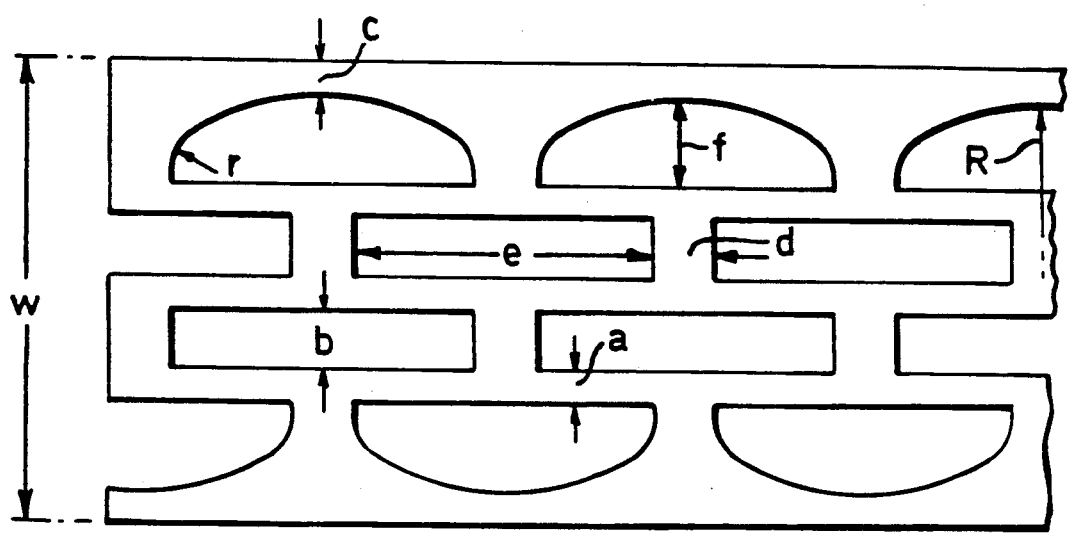
FIGS. 4 to 10 show alternative forms of strip usuable in seals embodying the invention.

FIG. 4 shows an alternative form of strip, having a width of ⅜ inch (9.52 mm) and a thickness of 0.025 inch (0.63 mm), with correspondingly modified dimensions of the slots and webs.

Figure 5:
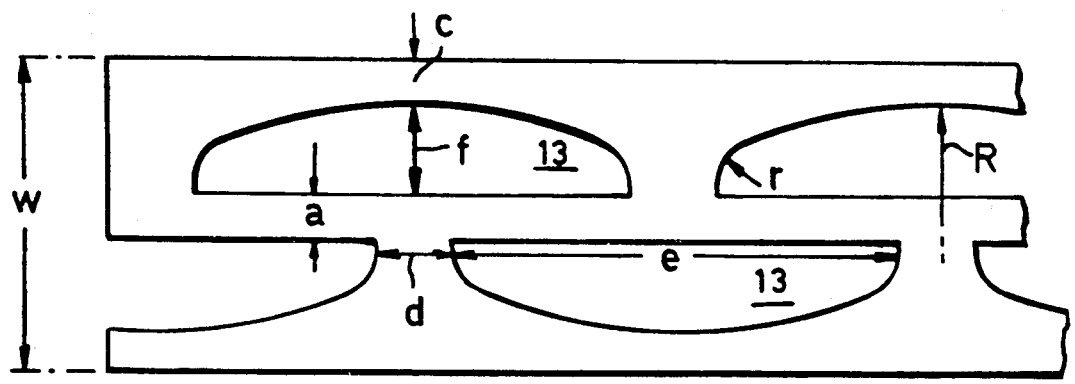

FIG. 5 shows a narrower strip, 0.25 inches (0.63 mm) wide and 0.032 inches (0.81 mm) thick. In this case, the inner lines of rectangular slots are omitted and the perforations consist of two lines of semi-arcuate slots 13, staggered relative to one another.

Strips with semi-arcuate slots with arcuate sides adjacent the strip edges, as in FIGS. 2 to 5, have been found to give particularly good results.

Tabulated below, by way of example only, are dimensions of the slots and webs of the strips shown in FIGS. 2, 4 and 5, which have been found to give good results in practice.

TABLE I
(FIG. 2)

| Designation | Description | Dimension |
|---|---|---|
| a | width of longitudinal web (17) | 0.036" |
| b | width of longitudinal slot (11) | 0.080" |
| c | width of marginal web | 0.036" |
| d | width of transverse web (15) | 0.072" |
| e | length of longitudinal slot (11) | 0.400" |
| f | width of marginal slot (13) | 0.080" |
| r | minor radius of marginal slot (13) | 0.045" |
| R | major radius of marginal slot (13) | 0.620" |

TABLE II
(FIG. 4)

| Designation | Description | Dimension |
|---|---|---|
| a | width of longitudinal web (17) | 0.025" |
| b | width of longitudinal slot (11) | 0.050" |
| c | width of marginal web | 0.025" |
| d | width of transverse web (15) | 0.050" |
| e | length of longitudinal slot (11) | 0.250" |
| f | width of marginal slot (13) | 0.075" |
| r | minor radius of marginal slot (13) | 0.040" |
| R | major radius of marginal slot (13) | 0.210" |

TABLE III
(FIG. 5)

| Designation | Description | Dimension |
|---|---|---|
| a | width of longitudinal web (17) | 0.036" |
| b | width of longitudinal slot (11) | |
| c | width of marginal web | 0.035" |
| d | width of transverse web (15) | 0.0625" |
| e | length of longitudinal slot (11) | 0.362" |
| f | width of marginal slot (13) | 0.0725" |
| r | minor radius of marginal slot (13) | 0.035" |
| R | major radius of marginal slot (13) | 0.420" |

Figure 6:
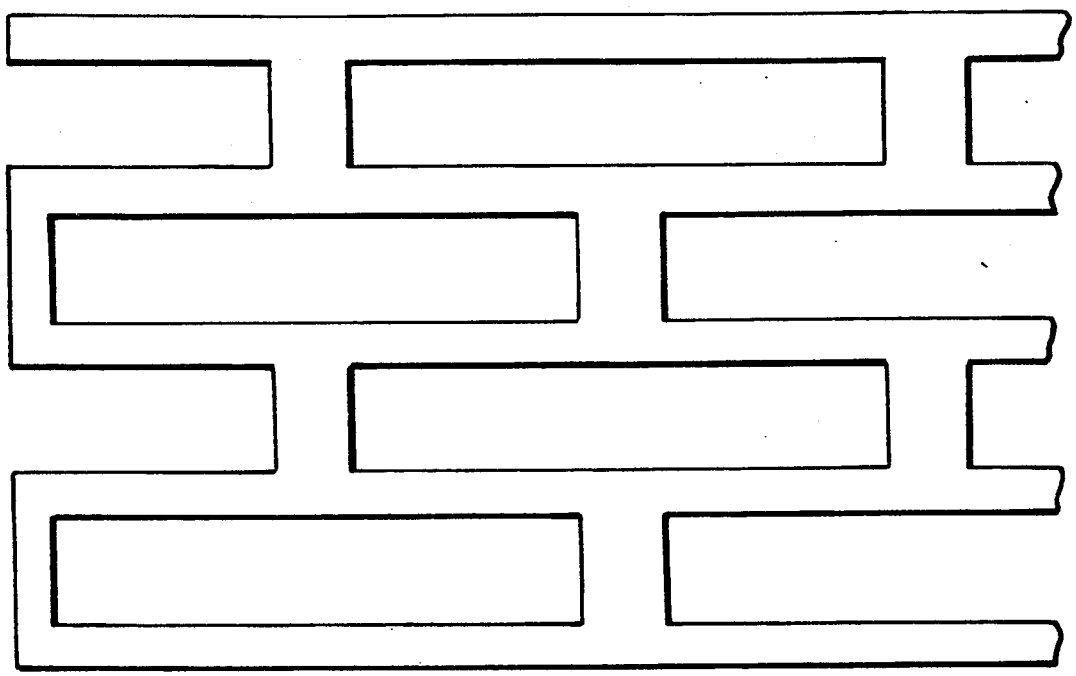

FIG. 6 shows a modified strip in which all of the slots are rectangular.

Figure 7:
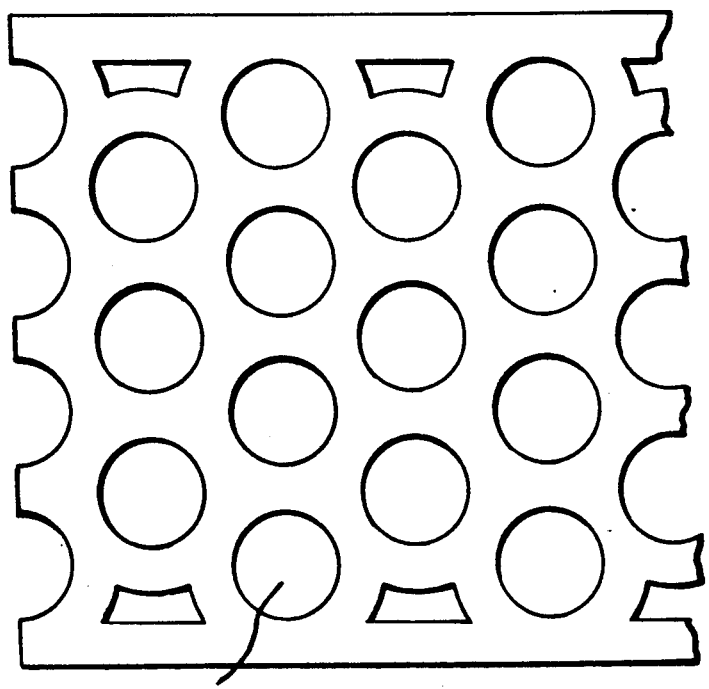

FIG. 7 shows another form of perforated strip in which the perforations are circles 19 of equal diameter, arranged in staggered rows. The circle diameter is approximately 1/6 of the width of the strip. In this strip, there are narrow regions in which the strip material is continuous across the width of the strip. Nevertheless this strip configuration permits local resilient flexibility of the strip, capable of accommodating local irregularities in the surfaces to be sealed.

Figure 8:
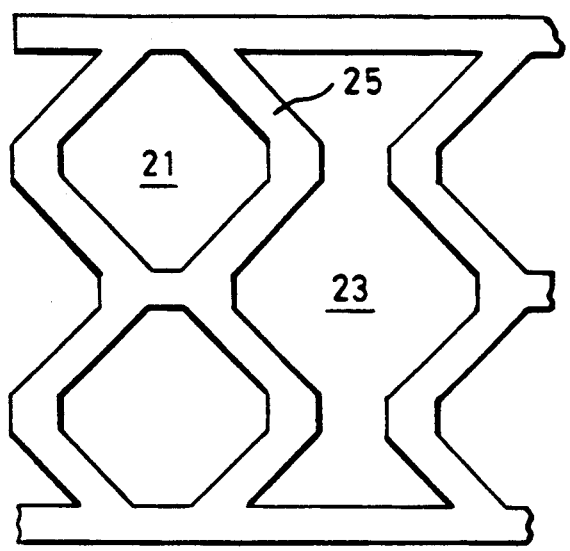

FIG. 8 shows a strip perforated with lozenge-shaped apertures 21 alternating with roughly spindle-shaped apertures 23, divided by zig-zag transverse webs 25 which can flex individually in response to local differences of compression.

Figure 9:
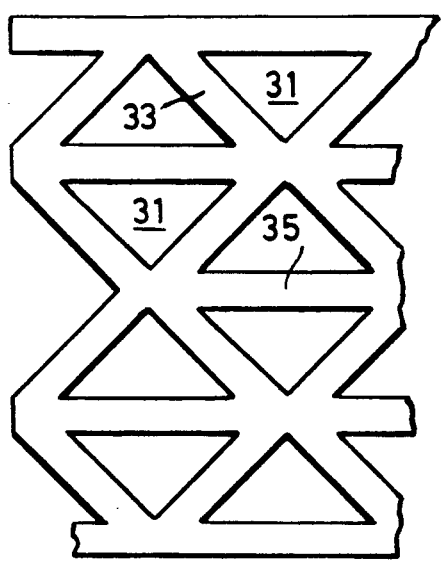

FIG. 9 shows yet another strip configuration comprising rows or lines of triangular apertures 31 which are not staggered, but are alternately of opposite orientation. Consequently, the strip comprises diagonal webs 33 extending across its width, and longitudinal webs 35 at the bases of the triangles. Again, these webs permit local differences of resilient deformation of the strip in the direction of its width.

Figure 10:
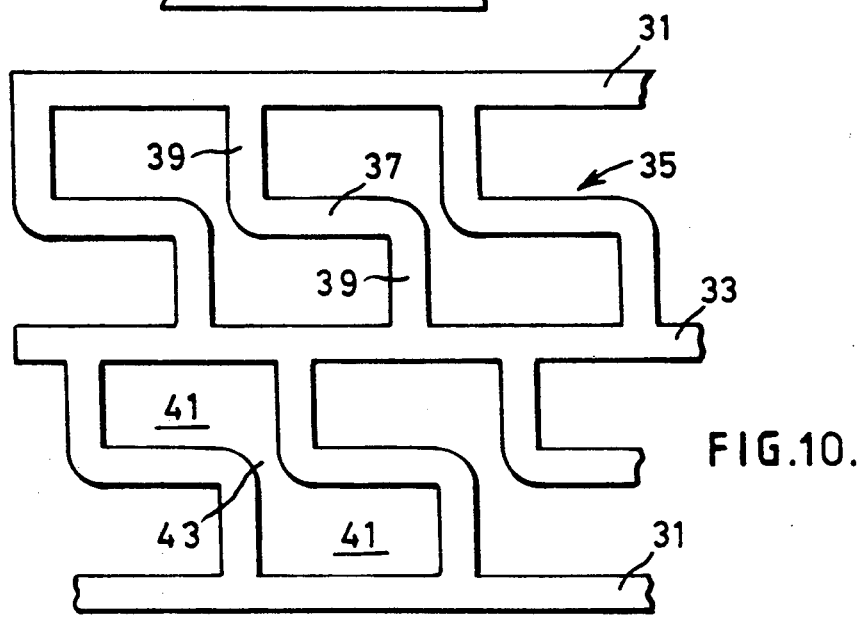

FIG. 10 shows yet another perforated strip. In this case, the strip comprises longitudinal webs 31 at respective edges, a central web 33, and intermediate webs 35 each extending between a web 31 and web 33 and each comprising a longitudinal central portion 37 and end portions 39 each perpendicular to the length of the strip, each web 35 being spaced from its neighbours so as to define apertures each comprising two longitudinally offset generally rectangular areas 41 joined by a narrow neck 43. On lateral compression, the outer webs 31, central web 33 and web portions 37 can flex to permit general deformation and local differences of deformation of the strip in the direction of its width.

Other configurations of apertures and webs will naturally suggest themselves to the skilled reader.

The present seal can be factory-made. Alternatively, it can be made or assembled on site, for example by nesting together prefabricated perforated metal rings, or by winding on a former a length of perforated metal strip and then securing the ends of the strip for example by welding. The resulting pack or coil of perforated metal strip is then enclosed within an essentially conventional envelope, alternatively, particularly in the case of a machined envelope, the envelope may be placed on a former and the strip then coiled into the envelope.

In a glass-lined vessel, apertures may need to be sealed over a range of sizes from 1 inch (25 mm) diameter to 7 feet (213 cm). The required seal thickness may vary from 1/16th of an inch to ½ inch (1.5 to 12.7 mm). Seals embodying the invention can seal vessel apertures of all these sizes. In terms of thickness, seals embodying the invention are especially suitable for thicker seals, typically 4.7 mm (0.18 inch) or more thick.

The present seal may also be made as a length with ends, instead of as a ring; means must then be provided to hold the adjacent layers of metal strip together in a stack to resist compression.

I claim:

1. A static seal comprising: an envelope having opposed sealing faces, and a filling within the envelope; characterized in that the filling comprises a plurality of adjacent turns of flat strip material, arranged in face to face contact with the width direction of the strip extending generally perpendicular to said sealing faces, the strip material being made of resilient material and having apertures extending through its thickness, distributed along the strip length, whereby the strip material is resilient in the direction of its width, and the adjacent turns of strip material are so arranged that they can slide and deform individually relative to one another, in the plane of the strip material.

2. A seal as claimed in claim 1 in which said apertures in the strip are closely spaced and each said aperture has a longitudinal dimension of the same order of magnitude as the width of the strip.

3. A seal as claimed in claim 1 in which the strip has webs or partitions of strip material between said apertures, and each of said webs or partitions has a transverse dimension comparable with the thickness of the strip.

4. A seal as claimed in claim 1 in which the arrangement of the apertures is such that, at no point along the length of the strip, is the strip material continuous across the width of the strip.

5. A seal as claimed in claim 1 in which the strip comprises a plurality of nested rings.

6. A seal as claimed in claim 1 in which the strip comprises a spiral winding.

7. A seal according to claim 1 further including means reducing friction between adjacent turns.

8. A seal according to claim 1 in which said apertures are slots extending along the strip.

9. A seal according to claim 8 in which the slots have a ratio of width to length of 1.5.

10. A seal according to claim 8 in which at least one line of said slots comprises slots with arcuate longitudinal sides.

11. A seal according to claim 1 having spaced across its width a plurality of longitudinally staggered lines of said apertures.

12. A seal according to claim 1 further including at least one fluid impervious barrier between adjacent turns for preventing fluid flow parallel to said sealing faces.

* * * * *